Figure 1:
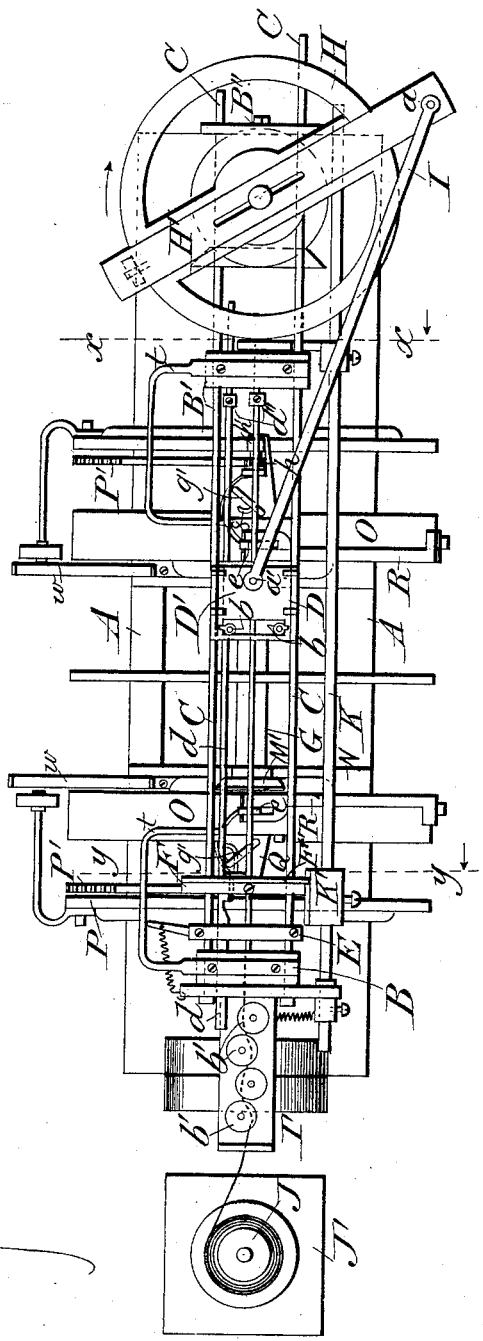

(No Model.)  4 Sheets—Sheet 1.

D. I. ECKERSON.
MACHINE FOR MAKING BALE TIES.

No. 348,833.  Patented Sept. 7, 1886.

Witnesses
F. H. Schott
A. Drefnider

Inventor
D. I. Eckerson

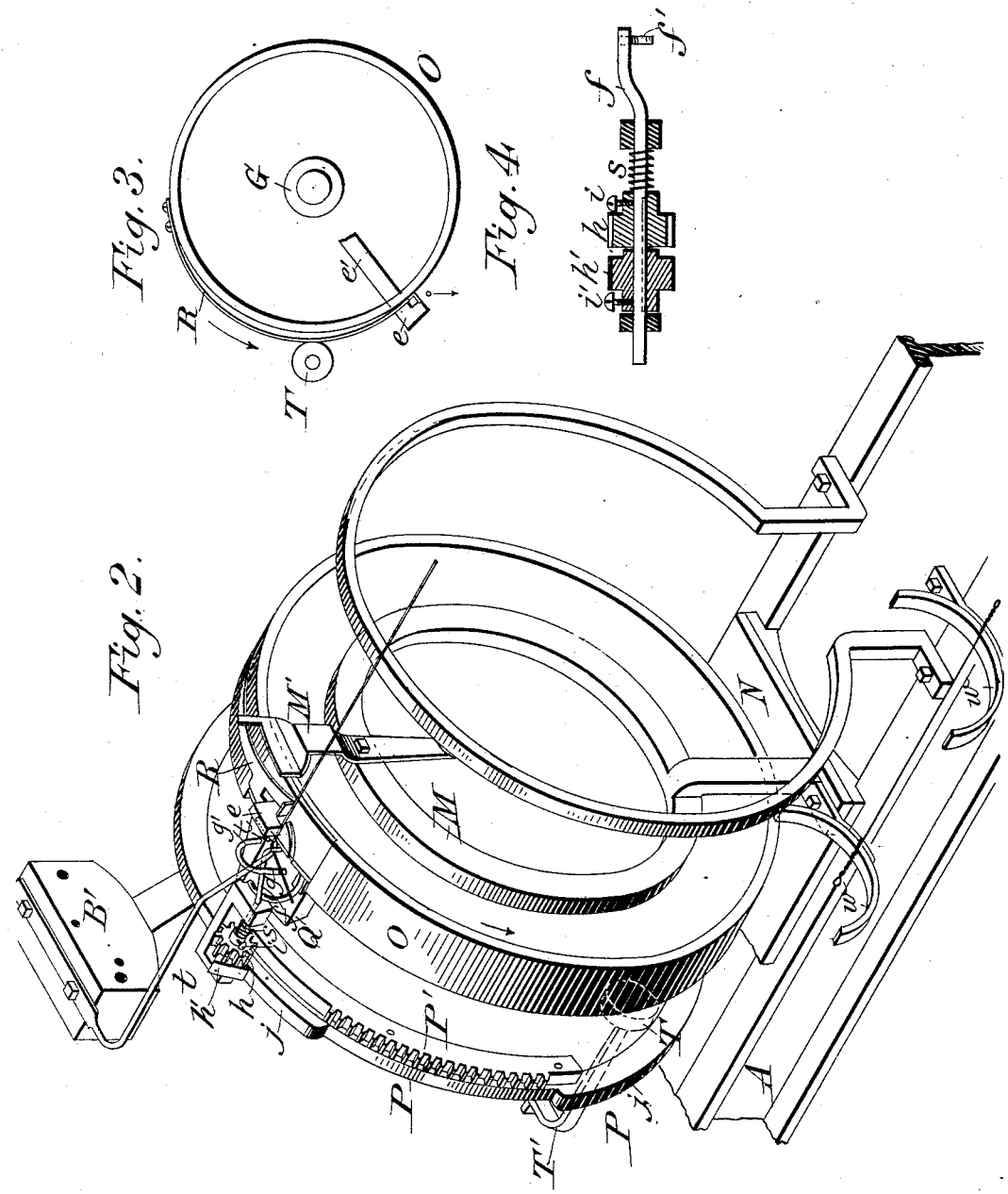

(No Model.) 4 Sheets—Sheet 3.
D. I. ECKERSON.
MACHINE FOR MAKING BALE TIES.
No. 348,833. Patented Sept. 7, 1886.
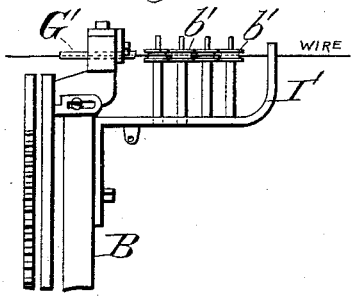
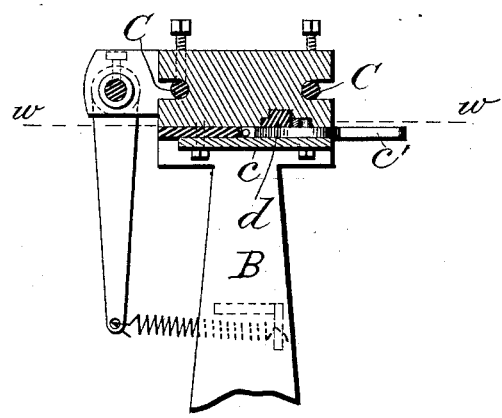
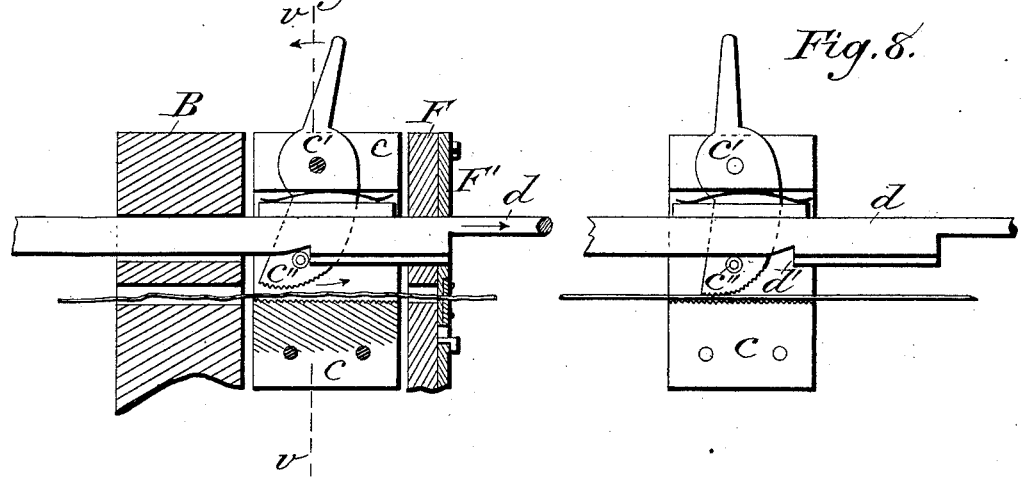
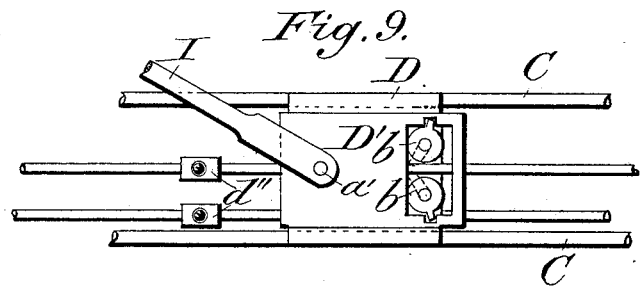
Witnesses
F. H. Schott
A. Dufenders
Inventor
D. I. Eckerson (No Model.)  
D. I. ECKERSON.  
MACHINE FOR MAKING BALE TIES.  
No. 348,833. Patented Sept. 7, 1886.
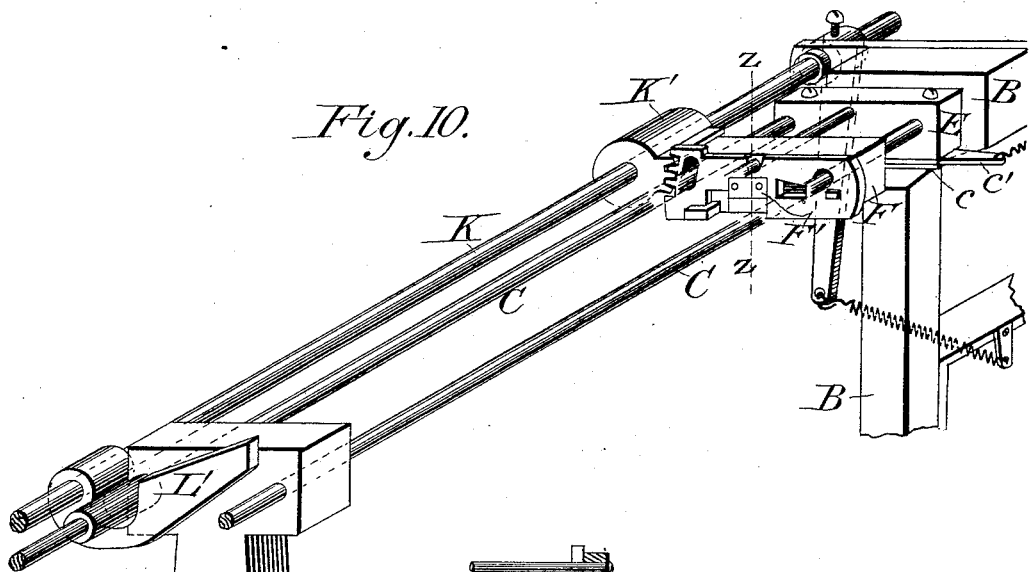
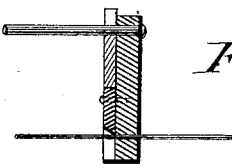
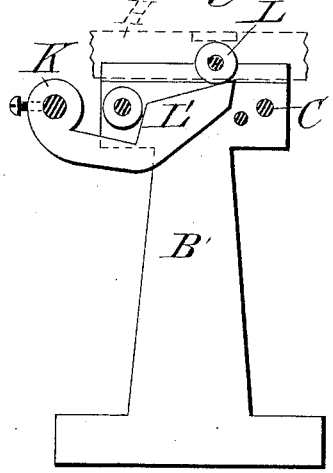
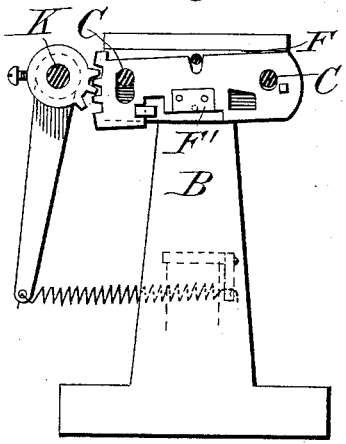
Witnesses  
F. H. Schott  
A. Diefendorf
Inventor  
D. I. Eckerson

UNITED STATES PATENT OFFICE.

DAVID I. ECKERSON, OF WORCESTER, NEW YORK, ASSIGNOR TO HIMSELF AND ABRAM DIEFENDORF, OF SAME PLACE.

MACHINE FOR MAKING BALE-TIES.

SPECIFICATION forming part of Letters Patent No. 348,833, dated September 7, 1886.

Application filed May 29, 1886. Serial No. 203,598. (No model.)

*To all whom it may concern:*

Be it known that I, DAVID I. ECKERSON, a citizen of the United States, residing at Worcester, in the county of Otsego and State of New York, have invented certain new and useful Improvements in Machines for Making Bale-Ties; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in that class of wire-working machines employed in making bale-ties and other articles of wire having a loop at one or both ends, and in which the straightening, stretching, and cutting off of the blank and the bending and twisting of the loop or loops in each end of every piece of wire after it has been stretched, straightened, and cut off is performed automatically upon a single machine; and it relates especially to certain improvements upon the machine for which United States Letters Patent No. 337,939 were granted to me on the 16th day of March, 1886, the object being to overcome certain difficulties encountered in the practical working of the machine described and claimed in the aforesaid patent. These difficulties consisted in certain defects in the mechanism for carrying the wire from the reel to the operative parts of the machine, in the apparatus employed in straightening and stretching, and in the devices for cutting off, twisting, and carrying the cut wire forward and delivering it, so that all the parts shall work together in unison, delivering the finished product in perfect form, and allowing the machine to be run at great speed without clogging.

This invention may therefore be said to consist in the construction and arrangement of the wire straightening and drawing mechanism, the cutting off and twisting mechanism, and the devices by which the tie is thrown from the periphery of the carrying-wheel, all as hereinafter described, and specifically stated in the claims.

In the accompanying drawings, Figure 1 is a plan of the machine, showing the general arrangement of parts. Fig. 2 is a perspective view of so much of one end of the machine as is necessary to illustrate the position and construction of the wire-supporting mechanism and throwing-off spring. Fig. 3 is a side view, on a reduced scale, of one of the carrying-wheels, throwing-off spring, and compressing-wheel by which it is operated. Fig. 4 is a detail sectional view of the twisting devices, illustrating the means by which it is made adjustable. Fig. 5 is a side elevation of a part of one of the supporting-standards with the wire-straightening devices attached. Fig. 6 is a sectional view on line $v\ v$, Fig. 7, showing a part of the wire-gripping mechanism. Fig. 7 is a horizontal section on line $w\ w$ of Fig. 6, with the jaws open. Fig. 8 is a plan of the same gripping devices shown in Fig. 7, the jaws being closed as in the act of stretching the wire. Fig. 9 is a plan view of the sliding cross-head, carrying the jaws which seize and draw forward the wire. Fig. 10 is a perspective view of the cutting-off apparatus; Fig. 11, a section on line X X, Fig. 1 presenting an end view showing the position of the cam-lever by which said apparatus is operated. Fig. 12 is a section on line Y Y, Fig. 1, showing a front view of the swinging cutter-bar and cutter in the act of severing the wire. Fig. 13 is a vertical section of the cutter-carrier and cutter-bar on line Z Z, Fig. 10.

In these several figures, A represents the bed-plate of the machine, preferably of cast-iron, although other material—as wood—having sufficient strength and solidity may be substituted. Upon this bed-plate are secured the vertical standards B, B', and B''. These standards have flanged bases, as shown in Figs. 11 and 12, to give them a broad supporting-surface upon the bed-plate and allow them to be firmly bolted to the same. The upper ends of the standards are expanded laterally, so as to give them a T-shaped head, the two arms of the head extending sufficiently to receive and carry the guide-rods C C, which brace the standards longitudinally and serve as guides and supports for the reciprocating cross-head D, adjustable clamp-block E, and cutter-carrier F.

A shaft, G, carried in suitable journal-bearings on the standards and provided with tight and loose pulleys to receive a belt from any suitable motor, gives movement to the several parts of the machine, among the principal of which is the fly-wheel H, carried upon a vertical shaft at one end of the machine and receiving motion through a pair of miter-gears, one of which is secured upon the shaft G and the other upon the vertical shaft. This fly-wheel is provided with a crank-pin carrying slide H', which lies in a groove, preferably of dovetailed form, that crosses the upper surface of the fly-wheel diametrically. This slide is made adjustable in the groove, so that the crank-pin $a$ may be placed at any desired distance from the axis of the vertical shaft to suit the varying lengths of the bale-ties or other articles to be manufactured.

Connecting the cross-head D and crank-pin $a$ is a pitman, I, which as the fly-wheel revolves gives a reciprocating movement to the cross-head, which slides back and forth on the guide-bars C C. The pitman is not connected directly to the body of the cross-head, but to a stud or pin, $a'$, projecting upward from the sliding plate D', which has a limited movement on the part D. (See Fig. 9.) This movement of the plate D' relatively to the part D operates the clamping-jaws, by which the end of the wire is seized and drawn along with the cross-head into the machine, and in the act of stretching the same. The special means employed for operating these jaws consist in two toothed wheels, $b\,b$, attached to the upper ends of vertical shafts, journaled in the part D, and carrying on their lower ends, beneath the cross-head, the clamping-jaws. The wheels $b\,b$ lie on top of the part D within a rectangular slot formed for their reception in the part D', and having at each end of said slot one or more recesses to receive the teeth of the wheels $b\,b$. The wire is carried upon a reel, J, mounted upon a standard, J', and located preferably in line with the machine, although this position is not essential, as it may be placed at almost any angle to said line without affecting the good working of the machine. From the reel the wire passes between a series of peripherally-grooved sheaves, $b'$, loosely mounted on vertical spindles in the bracket I'. After passing between these sheaves, which are placed so as to cause the wire to pursue a zigzag line between them, bending it to the right and left alternately, which action renders the wire pliable and free from kinks, it may enter a straightening device, G', attached to the bracket I' or the standard B, as shown in Fig. 5 of the drawings. This straightening device may be a straight tube, as shown, or it may be one of any of the well-known forms of that article in common use, and will be found useful in working unannealed wire; but with wire that has been annealed it is not needed, as the stretching apparatus straightens such wire perfectly.

To hold the wire during the stretching operation, a clamp-block, E, is secured upon the guide-bars by set-screws, so that its position is adjustable upon said bars. This clamp-block carries upon its under side a steel plate, $c$, having its edge serrated, as shown in Fig. 7. Along this serrated edge the wire passes, and when it is desired to stop its forward movement the cam-jaw $c'$, which is pivoted to the clamp-block and has its inner side serrated, is brought to bear against the wire, compressing it against the edge of plate $c$, and effectually preventing any further forward movement until the cam-jaw $c'$ is released. In order to effect this movement of the jaw $c'$, a cam-rod, $d$, is placed lengthwise of the machine, passing over the jaw $c'$, and acting upon the same through a stud, $c''$, which projects from the upper side of the jaw. When this stud is in the recess $d'$ of the jaw, the latter is open and allows the free passage of the wire; but when the rod is drawn forward the inclined face of the notch, acting upon the stud, forces the jaw into contact with the wire and the latter against the serrated edge of plate $c$, where it is held firmly until the cam-rod moves in the opposite direction and again releases it, as is clearly shown in Figs. 7 and 8, in the first of which the jaw is open, the stud being in the notch of the cam-rod, while in the last it is closed, the rod having been drawn forward so as to force the stud out of the notch and cause the jaw to firmly clamp the wire against the edge of plate $c$, as in the act of stretching. This longitudinal movement of the cam-rod is produced by means of an adjustable collar, $d''$, secured upon the rod in such a position that when it is desired to clamp the wire the collar will be struck by the cross-head in its movement, thus causing the cam-rod to act upon the jaw. A spring is placed behind the rod within the clamp-block, to insure the action of the same upon the jaw, and allow the necessary lateral movement, a steel plate being placed between the spring and rod to receive the wear.

In order to cut the wire to proper lengths after it has been drawn into the machine and stretched by the mechanism hereinbefore described, a cutter-carrier, F, having a free movement within certain prescribed limits, is placed upon the guide-bars C, near the clamp-block E, so that the wire shall be severed near the jaws of said clamp-block.

Upon one side of the cutter-carrier is pivoted a cutter-bar, F', so arranged that its cutting-edge may swing across the orifice in the carrier, through which the wire passes, and thus sever it. To produce this movement of the cutter-bar, its outer end is toothed, so as to form a segment of a spur-gear. This segment engages with a pinion, K', upon a rock-shaft, K, which shaft receives motion from a cam-wheel, L, attached to the fly-wheel and acting upon a cam-lever, L', secured to one end of the shaft K, a rubber ring or buffer being placed upon one of the guide-bars C to receive the shock of the cam-lever when it returns to its normal position after having been forced out by the cam-wheel. To aid in this return, an arm is secured to the shaft K, and extends downward to near the bed of the machine, where it is connected with a strong spring, the action of which returns the shaft to its first position. After the wire has been cut and released by the jaws of the cross-head it falls upon the supports M', attached to the cam-plates M, which cam-plates are carried upon the movable supports N, resting on guideways of the bed-plate A, and made adjustable thereon.

Sliding upon the shaft G, and carried with the cam-plates by the movable supports N, are the carrying-wheels O, to each of which is attached a radially-sliding clamping-jaw, e, provided with a stem, e', which extends toward the center of the wheel, where it is attached to springs, and operated by suitably-formed guides upon the cam-plates M. It will be seen that the support M' extends a short distance above the periphery of the wheel O, thus preventing the wire from coming in contact with said periphery until the wire runs under the spring t, secured to the adjacent standard with its free end projecting over the carrying-wheel O, that holds and pushes said wire under the clamping-jaw, which immediately seizes it, drawing it down firmly upon the periphery of wheel O. The continued revolution of said wheel brings the wire in contact with the forming-pin f' on the end of the twisting-shaft f, carried by the bracket Q, attached to one side of the wheel, and simultaneously therewith the bending-hook g on the upper end of the shaft g', also carried by said bracket, which has a semi-revolution imparted to it by suitable gears, bends the wire around the forming-pin, after which the pinion h upon the twisting-shaft engages with the segmental gear P' on the gear-plate P, and as the wheel advances the engagement of said pinion with the segment gear upon the gear-plate rotates the twisting-shaft and twists the end of the wire which has been bent around the forming-pin with that portion projecting beyond the jaw e, uniting them firmly, so that when the wire is thrown from the pin and periphery of the wheel by the means hereinafter described the loop upon the end of the wire will be found to have been perfectly formed and the extremity of the wire firmly twisted to the body of the same.

In order to make the pinion engage properly with the segments on the gear-plate, a triangular block, h', is secured upon the twisting-shaft in the rear of the pinion and rides on the raised parts j of the gear-plate; but these raised parts being removed opposite the toothed segments the block drops off the same and allows the pinion to engage with the teeth.

As it is desirable to change the length of the twist to suit different sizes of wire, the pinion h and triangular block h' are made adjustable upon the twisting-shaft f by means of set-screws i and i', which pass through the hubs of the pinion and block and secure them firmly to the shaft at any desired point.

To allow the twisting-shaft to move endwise as the wire is taken up by the twist, a spring, s. is coiled about the same between the hub of the pinion and the adjacent journal-bearing of the shaft in bracket Q. An additional device consisting of a spring-arm, t, may be attached to the standards, its bent end pressing upon the wire and assisting to retain it in a proper position during the clamping of the same to the periphery of the wheel by the clamping-jaw e. After the loops have been formed, it becomes desirable to throw the wire from the wheels as soon as possible, to accomplish which each wheel is provided upon its periphery with a spring, R, one end of which is securely fastened to the wheel, and the other, having its end turned outward, lies upon it, the spring between its ends being bent outward, as shown in Figs. 2 and 3. To cause this spring to act upon the wire and force it from the jaws, a wheel, T, turning loosely upon a spring-arm, T', attached to the standards or other suitable parts of the machine, is placed in such a position as to come in contact with the spring, depressing its outwardly-bowed part and causing its bent free end to project suddenly forward, forcing the wire from the clamps and throwing it into the receptacle formed by the curved arms W, attached to the bed-plate or other suitable part of the machine.

It will be apparent that, if desired, a counter or register may be attached to the machine to determine the number of bale-ties or other articles manufactured without the trouble of counting them; but as these machines are common, and the attachment of the same to this machine requires no new devices involving patentable inventions, I have not considered it necessary to illustrate or particularly describe such attachment.

Having thus described my invention, I claim as new and desire to secure by Letters Patent the following:

1. In a machine for making bale-ties, the combination of the wire-supplying devices, consisting of the reel-support, the reel, a series of wire-conducting sheaves so placed as to give the wire a series of lateral bends as it passes between them, a wire-straightening device, G', and the mechanism for stretching, cutting, forming the loops, and twisting the same, all constructed and arranged for joint operation, substantially as shown and described.

2. In a bale-tie machine, the combination, with the straightening and cutting mechanism, of the cam-plate M, the clamp e, and the wire-support M', arranged to receive the wire as it drops from the stretching and cutting apparatus and support the same clear from the periphery of the carrying-wheel O until it is caught by the clamp e, substantially as shown and described.

3. In a bale-tie machine, the twisting-shaft $f$, carrying the pinion $h$, and triangular block $h'$, said pinion and block being made adjustable upon the shaft by means of set-screws $i$ and $i'$, passing through the hubs of the same and bearing against the shaft, for the purpose of adjusting the position of the shaft to the length of twist given the wire, as set forth.

4. In a bale-tie machine, the combination of the wheels O, carrying the springs R, with the pressure-rollers T, mounted upon spring-arms T', for the purpose of compressing the spring and throwing off the finished tie, as set forth.

In testimony whereof I affix my signature in presence of two witnesses.

DAVID I. ECKERSON.

Witnesses:
W. J. SLOAN,
ABRAM DOEFENDORF.